US011409989B2

(12) United States Patent
Taheri et al.

(10) Patent No.: US 11,409,989 B2
(45) Date of Patent: Aug. 9, 2022

(54) VIDEO OBJECT DETECTION WITH CO-OCCURRENCE

(71) Applicant: ObjectVideo Labs, LLC, Tysons, VA (US)

(72) Inventors: Sima Taheri, McLean, VA (US); Gang Qian, McLean, VA (US); Sung Chun Lee, Tysons, VA (US); Sravanthi Bondugula, Vienna, VA (US); Allison Beach, Leesburg, VA (US)

(73) Assignee: ObjectVideo Labs, LLC, Tysons, VA (US)

( * ) Notice: Subject to any disclaimer, the term of this patent is extended or adjusted under 35 U.S.C. 154(b) by 51 days.

(21) Appl. No.: 17/037,954

(22) Filed: Sep. 30, 2020

(65) Prior Publication Data

US 2021/0117724 A1 Apr. 22, 2021

Related U.S. Application Data

(60) Provisional application No. 62/924,249, filed on Oct. 22, 2019.

(51) Int. Cl.
*G06K 9/62* (2022.01)
*G06N 3/04* (2006.01)
*G06N 3/08* (2006.01)
*G06V 20/52* (2022.01)
*H04N 7/18* (2006.01)

(52) U.S. Cl.
CPC .......... *G06K 9/6256* (2013.01); *G06K 9/627* (2013.01); *G06K 9/6261* (2013.01); *G06K 9/6262* (2013.01); *G06N 3/04* (2013.01); *G06N 3/08* (2013.01); *G06V 20/52* (2022.01); *H04N 7/183* (2013.01)

(58) Field of Classification Search
None
See application file for complete search history.

(56) References Cited

U.S. PATENT DOCUMENTS

| 5,937,092 | A | 8/1999 | Wootton et al. |
| 8,558,892 | B2 | 10/2013 | Brodsky et al. |
| 2021/0027103 | A1* | 1/2021 | Brower ................ G06K 9/2054 |

* cited by examiner

*Primary Examiner* — Leon Flores
(74) *Attorney, Agent, or Firm* — Fish & Richardson P.C.

(57) ABSTRACT

Methods, systems, and apparatus, including computer programs encoded on computer storage media, for model co-occurrence object detection. One of the methods includes accessing, for a training image, first data that indicates a detected bounding box for a first object depicted in the training image and a predicted type label, accessing, for the training image, ground truth data for one or more ground truth objects, determining, using the first data and the ground truth data, that i) the detected bounding box represents an object that is not a ground truth object represented by the ground truth data or ii) the predicted type label for the first object does not match a ground truth label for the first object identified by the ground truth data, determining a penalty to adjust the model using a distance between the detected bounding box and the labeled bounding box, and training the model using the penalty.

22 Claims, 6 Drawing Sheets

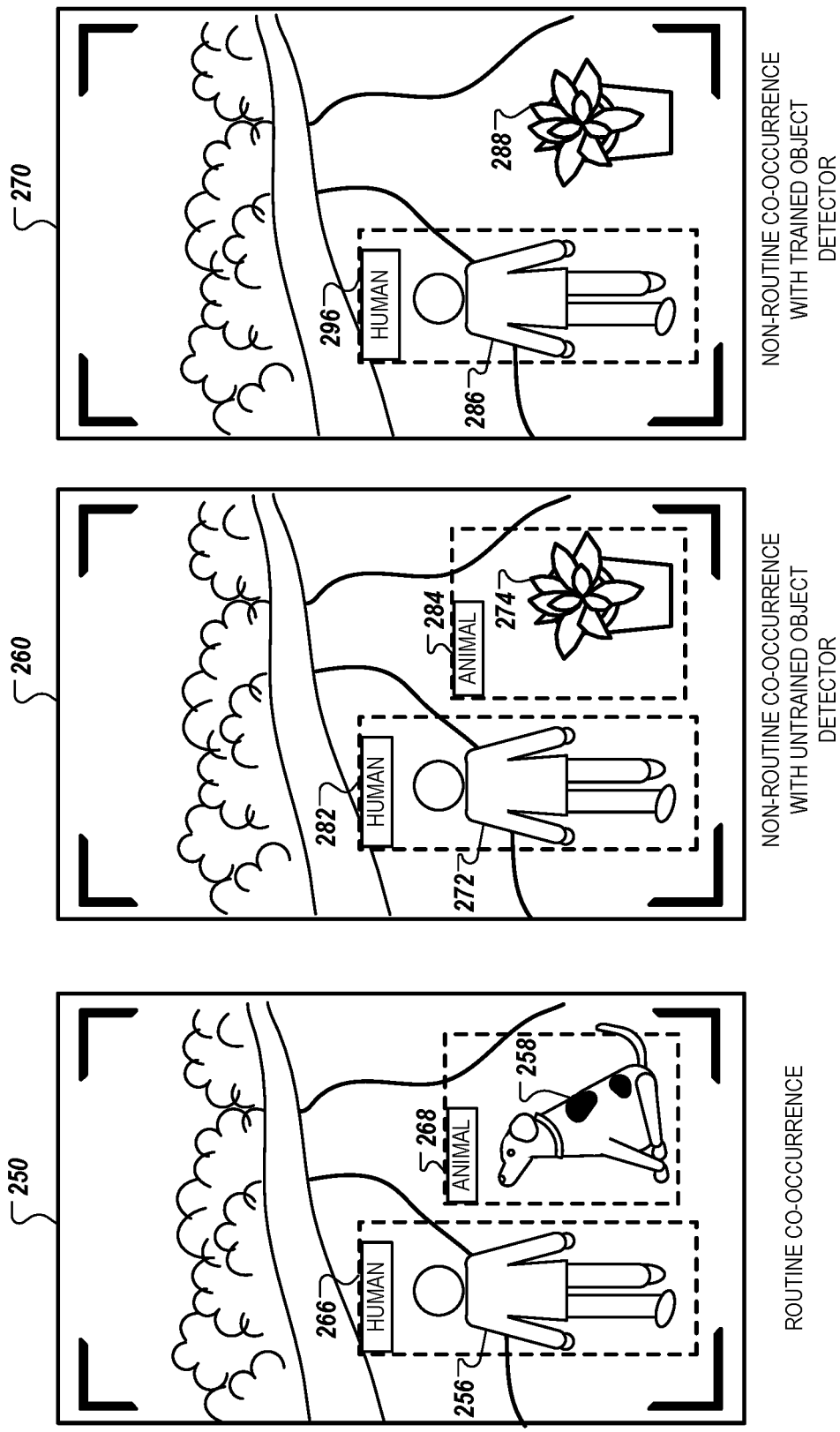

VIDEO OBJECT DETECTION WITH CO-OCCURRENCE

CROSS-REFERENCE TO RELATED APPLICATION

This application claims the benefit of U.S. Provisional Application No. 62/924,249, filed on Oct. 22, 2019, the contents of which are incorporated by reference herein.

TECHNICAL FIELD

This disclosure application relates generally to cameras.

BACKGROUND

Some properties are equipped with monitoring systems that include sensors and connected system components. Some residential-based monitoring systems include cameras.

SUMMARY

Techniques are described for video object detection with co-occurrence.

Some residents and homeowners equip their properties with monitoring systems to enhance the security, safety, or convenience of their properties. A property monitoring system can include cameras that can obtain visual images of scenes at the property. In some examples, a camera can be incorporated into a component of the property monitoring system, such as a doorbell. In some examples, a camera may be a separate device, e.g., a surveillance camera located inside or outside the property.

A camera, e.g., a doorbell camera, can detect objects and track object movement within a field of view. For example, a doorbell camera with a field of view that includes a front yard of a property can track positions and movements of objects of interest in the front yard. Objects of interest can include, for example, humans, vehicles, and animals. The objects of interest may be moving or stationary.

In some examples, objects of interest detected by a doorbell camera can trigger a property monitoring system to perform one or more actions. For example, detections of an object of interest that satisfies pre-programmed criteria may trigger the property monitoring system to send a notification to a resident of the property or to adjust a setting of the property monitoring system. Example criteria can include a position of an animal within a certain range of the property, a threshold number of humans approaching the property, and/or a vehicle approaching the property late at night. For a property monitoring system to correctly perform an action based on a detected object, a doorbell camera needs to accurately detect objects, e.g., so that the property monitoring system can send valid notifications to the residents or adjust a setting appropriately.

A neural network object detection model of a camera can be trained on a large dataset of images. Surveillance cameras in residential areas, e.g., doorbell cameras, mainly capture images of humans, animals, and vehicles. While there can be a wide variety of human, animal, and vehicle images in any dataset captured by residential cameras and used for object detection model training, the images may have similar properties that can cause bias in the model. This bias in the model can cause the model to inaccurately detect objects as a human, an animal, or a vehicle.

A source of bias is co-occurrence of objects in video images. Co-occurrence can be defined as two or more objects appearing near to one another within the same image. For example, in residential videos, animals commonly appear near humans. Therefore, an object detected near a human may have a high probability of being an animal. In another example, an object detected near a vehicle may have a high probability of being a human. Co-occurrence of other objects can also be observed, e.g., humans commonly appearing near other humans.

Patterns of co-occurrence in a dataset can improve the ability of an object detection model to use context information for detecting objects, e.g., can improve an accuracy of the object detection model. For example, if a human is located near an animal in an image, and the object detection model accurately identifies the animal, co-occurrence bias can improve the ability of the object detection model to accurately identify the other object as a human.

In some examples, co-occurrence bias can cause false alarms to be generated by an object detection model, e.g., can reduce an accuracy of the object detection model. For example, if a shrub is located near a human in image, and the object detection model accurately identifies the human, the object detection model may falsely identify the shrub as an animal due to co-occurrence bias.

A model training system can incorporate co-occurrence bias into the training process for object detection models in order to reduce false alarms generated by the trained model. An adaptive penalty scheme based on co-occurrence can be introduced into the training process. For instance, based on detections that the model generates, positive and negative errors are calculated to penalize the model for false detections caused by co-occurrence bias. The model training system can combine, e.g., multiply, a training value, e.g., an error value, with a scaling factor determined based on the distance between a false detection bounding box for a first object and a ground truth bounding box for a second object, e.g., a co-occurring object. The model training system can then update parameters of the object detection model based on the resulting backpropagation penalty that is the combination of the training value and the scaling factor. Training an object detection model to reduce co-occurrence bias can reduce the number of false detection errors, improving object detection accuracy.

The subject matter described in this specification can be implemented in various embodiments and may result in one or more of the following advantages. In some implementations, the systems and methods described in this document can improve an accuracy of a model that detects co-occurring objects. For instance, the systems and methods can improve the accuracy of the model using a distance between an incorrectly detected object and a labeled object, e.g., a ground truth object, during training. Accordingly, the number of false detections in the vicinity of true detections (ground truth objects) may be reduced and, as a result, the accuracy of the model is increased by improving model precision.

The details of one or more implementations of the subject matter described in this specification are set forth in the accompanying drawings and the description below. Other features, aspects, and advantages of the subject matter will become apparent from the description and the drawings.

BRIEF DESCRIPTION OF THE DRAWINGS

FIGS. 2A and 2B illustrate example images showing video object detection with co-occurrence.

Like reference numbers and designations in the various drawings indicate like elements.

DETAILED DESCRIPTION

Figure 1:
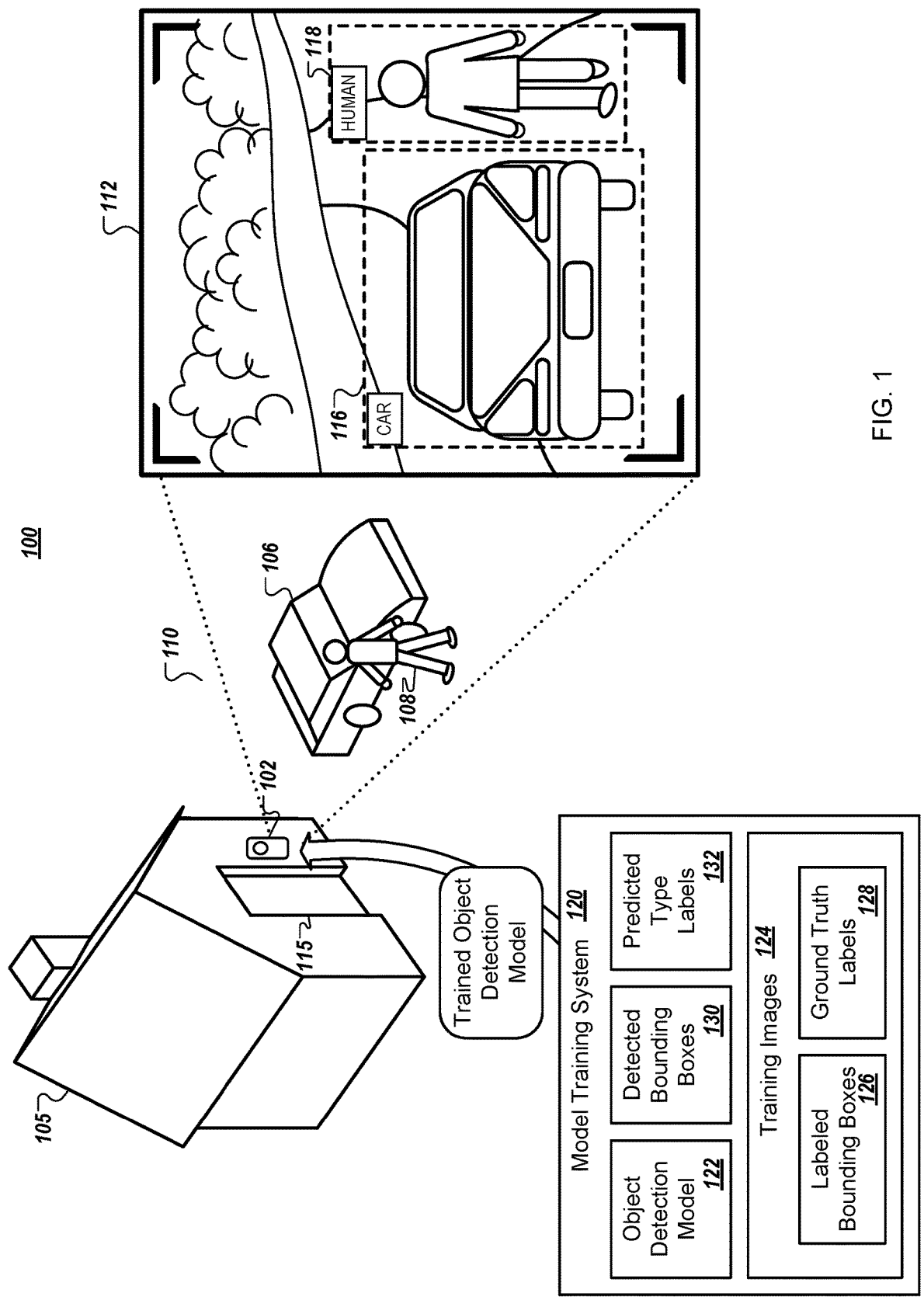
FIG. 1 illustrates an example system for video object detection with co-occurrence using a doorbell camera.

FIG. 1 illustrates an example environment 100 for video object detection with co-occurrence using a doorbell camera. In FIG. 1, a doorbell camera 102 is installed at a property 105. The property 105 can be a home, another residence, a place of business, a public space, or another facility that has one or more doorbell cameras 102, or other security cameras, installed. The doorbell camera 102 is a component of a doorbell that is installed external to the property 105. The doorbell camera 102 is installed near a front door 115 of the property 105. In some examples, the doorbell camera 102 is a component of a home monitoring system that collects data from various sensors to monitor conditions and events at the property 105. The doorbell camera 102 can be any appropriate type of camera instead of a doorbell camera. The doorbell camera 102 can be located at any appropriate position at the property 105, e.g., internal to the property 105.

In addition to the doorbell camera 102, the doorbell may include other components and sensors. For example, the doorbell may include a button that, when depressed, causes an audible tone to sound at the property 105. The doorbell may also include additional sensors, e.g., a motion sensor, temperature sensor, light sensor, and a microphone.

The doorbell camera 102 captures video from a scene within a field of view 110. The video includes multiple sequential images, or frames. The video can include any type of images. For example, the video can include visual light images, infrared images, or radio wave images. In some examples, the video can include a combination of one or more types of images, e.g., visual light images with infrared illumination. The field of view 110 is an area that is observable by the doorbell camera 102. The doorbell camera 102 has a field of view 110 that includes the area in front of the property 105. For example, the field of view 110 can include a front yard, walkway, and street in front of the property 105.

In some examples, the doorbell camera 102 can capture video continuously. In some examples, the doorbell camera 102 can capture video when triggered by an event. For example, the doorbell camera 102 may capture video when triggered by depression of the button on the doorbell. In some examples, the doorbell camera 102 may capture video when triggered by activation of the motion sensor or other sensor of the doorbell.

The doorbell camera 102 may capture video for a preprogrammed amount of time. For example when triggered by depression of the button on the doorbell, the doorbell camera 102 may capture video for a preprogrammed time of 10 seconds, 30 seconds, or 60 seconds. When triggered by a motion sensor, the doorbell camera 102 may capture video for a preprogrammed time and/or may capture video until the motion sensor no longer detects motion.

The doorbell camera 102, or another component in the environment 100, can perform video analysis on captured video. Video analysis can include detecting, identifying, and tracking objects of interest in the video. Other components in the environment 100 that can perform the video analysis can include one or more computers that receive an image, or a video that includes a sequence of images, from the doorbell camera 102.

Surveillance cameras in residential areas, e.g., doorbell cameras, mainly capture videos of humans, animals, and cars, and the interactions between various combinations of humans, animals, and cars. While there can be a wide variety of human, animal, and car images in any dataset of images captured by surveillance cameras, the videos may have some similar properties that can cause bias in the dataset.

A common source of bias is co-occurrence of objects in videos. Co-occurrence can be defined as two or more objects of interest appearing next to each other within the same image. Objects of interest can include humans, animals, vehicles, or a combination of two or more of these. In residential videos, animals can commonly appear in the same image as a human. Therefore, an object detected near a human may have a high probability of being an animal, e.g., a probability that is higher than another probability that the object is something other than an animal. In another example, an object detected near a car may have a high probability of being a human, e.g., a probability that is higher than another probability that the object is something other than a human. Thus, in videos captured by residential cameras, animals and humans can frequently co-occur, and humans and vehicles can frequently co-occur.

Patterns of co-occurrence in a dataset can improve the ability of an object detection model to accurately detect objects using context information for objects depicted in images. For example, if a human is located near an animal in an image, and the object detection model accurately identifies the animal, co-occurrence bias can improve the ability of the object detection model to accurately identify the other object as a human.

In some examples, co-occurrence bias can cause false alarms to be generated by an object detection model. For example, if a shrub is located near a human in an image, and the object detection model accurately identifies the human, the object detection model may falsely identify the shrub as an animal due to co-occurrence bias.

To reduce false alarms generated by the training model, a model training system 120 can incorporate co-occurrence bias into the training process for an object detection model 122. An object detection model 122 that is trained to reduce co-occurrence bias can reduce the number of false detection errors, improving object detection accuracy for a camera that uses the object detection model 122 after the training process.

For instance, the model training system 120 can train the object detection model 122 using multiple training images 124. Each of the training images 124 can depict one or more objects, e.g., objects of interest, and at least some of the training images 124 depict two or more objects, e.g., objects of interest. The training images 124 can include, for the objects of interest for which the object detection model 122 is being trained, labeled bounding boxes 126 and ground truth labels 128.

For instance, for a first training image that depicts only a human, the first training image can have a labeled bounding box that indicates an area within the first training image in which the human, as an object of interest, is depicted. The first training image can include a ground truth label for the labeled bounding box that indicates the type of the object of interest. In this example, the first ground truth label can be "HUMAN."

A second training image that depicts a human and a car can include two labeled bounding boxes and two corresponding ground truth labels. A first labeled bounding box for the second training image can indicate an area within the second training image in which the human is depicted. A second labeled bounding box for the second training image can indicate an area within the second training image in which the car is depicted. A first ground truth label for the human can be "HUMAN" and a second ground truth label for the car can be "CAR."

During the training process, the model training system 120 can provide some of the training images 124 to the object detection model 122 as input and receive, as output, data that indicates detected bounding boxes 130, predicted type labels 132, or both. For instance, the model training system 120 can provide data for the first training image to the object detection model 122. The object detection model 122 can analyze the data for the first training image and predict whether one or more objects of interest are depicted in the first training image.

As part of this prediction, the object detection model 122 can detect one or more bounding boxes 130 that each have a threshold likelihood of surrounding an object depicted in the first training image. For each of the detected bounding boxes 130, the object detection model 122 can determine a corresponding predicted type label 132 that indicates a predicted type for an object surrounded by the detected bounding box 130. The predicted type can be from two or more different object types, e.g., such that each type is for a different object of interest. The object types can include a combination of two or more of human, animal, or vehicle.

The model training system 120 can use the prediction generated by the object detection model 122 to update the model. For example, when the object detection model 122 is a neural network, the model training system 120 can perform backward propagation to update one or more weights in the neural network. When the object detection model 122 accurately predicts the detected bounding boxes 130 and the predicted type labels 132 for a training image, the training process can include updating one or more weights based on corresponding likelihoods that the predicted type labels are for the corresponding objects. The model training system 120 can use any appropriate process to update the object detection model 122.

The training process can include updating the object detection model 122 using a training value. For instance, when the object detection model 122 predicts that the object in the first training image is an animal or that the object in the first image is a human, but with only a sixty-four percent likelihood, the model training system 120 can determine a training value based on the prediction by the object detection model and the corresponding ground truth values for the first training image.

If the object detection model 122 predicts a label of "ANIMAL" for the second bounding box that indicates the location of the car in the second training image, the model training system 120 can use data for a labeled bounding box and data for the detected bounding box that has incorrect data, e.g., an incorrect predicted type label or that does not correspond to an object of interest, to train the object detection model 122. For instance, the model training system 120 can train the object detection model 122 using a distance between the detected bounding box 130 for the car and the first labeled bounding box for the human. The model training system 120 can use this distance to determine a scaling factor for the training process.

In some examples, the model training system 120 can combine a training value tv, which is based on an error that represents the incorrect prediction, with a scaling factor sf. For instance, the model training system 120 can use equation (1) below to determine the scaling factor sf, where box_FA indicates a detected bounding box that is a false alarm, box_GTh indicates a ground truth bounding box, and distance is a function that determines a distance between the input bounding boxes.

$$sf=\min(1,1+1/\text{distance}(box\_FA, box\_GTh)) \quad (1)$$

The value of sf may be always greater than 1, which means the backpropagation error p calculated by p=tv*sf is not reduced for any false positives, but for certain cases of false positives, the backpropagation error is increased by a factor that is reversely proportional to the distance between input boxes.

The distance function can be a measure of intersection between the input bounding boxes. The number of input bounding boxes can be any appropriate number, e.g., two bounding boxes. For instance, given two input bounding boxes, distance can output a value that indicates an amount, e.g., percentage, of overlap between the two input bounding boxes. In some examples, the distance function can output an Intersection over Union (IoU) coefficient based on the input bounding boxes.

In some implementations, the value of IoU is equal to 1 when boxes are the same and 0 when there is no overlap between boxes. But when a scaling factor is greater than one even when there is no overlap between the boxes, a generalized intersection over union function (GIoU) may be used. GIoU may perform like IoU when the boxes have overlap and when there is no overlap between boxes, and GIoU may generate a negative number that decreases to −1 as the boxes get further away from each other. In this case the scaling factor may defined as:

$$sf=\min(1,2+GIoU(b1,b2))) \quad (2)$$

Adding two to GIoU(b1,b2) keeps its values in the range of one to three. For false detection boxes the IoU with the gth box is smaller than a threshold otherwise it is considered as a true positive box. So the upper bound of the sf is defined by that threshold.

In some implementations, an impact zone can be defined around each FA_box. The impact zone indicates the surrounding area around the FA_box that influence the detection. In other words, the impact zone has the context information included in the neural network decision through the receptive filed of model filters. The impact zone can be defined using a 2-dimensional Gaussian function centered at the FA_box and with a proper standard deviation. It can also be defined by computing the receptive field of the model corresponding to the FA box. So the impact of a close by groundtruth box on the detection of FA_box can be measured by aggregating the values of the impact function inside the gth bounding box. In this example, the impact of multiple gth boxes can be aggregated as well.

In some implementations, if the criterion to say that a FA_box is detected as a result of bias from co-occurrence of some objects in the scene is the distance between FA_box and the closest gth box, then the number of gth boxes will not be important. But the impact zone around the FA_box is used, then the impact of multiple gth objects can be aggregated. In some examples, the model training system 120 can normalize the output from the distance function. For instance, the model training system 120 can normalize the output from the distance function using a size of one or more bounding boxes from two or input bounding boxes.

The distance function can output any appropriate values. A higher output value can indicate a greater amount of overlap between the two bounding boxes. A lower output value can indicate a smaller amount of overlap between the two bounding boxes. For example, when two bounding boxes do not overlap at all, the distance function can output a value closer to one, e.g., an output value that is greater than or equal to one (e.g. using GIoU as distance function or using the impact zone). In some examples, when there is no overlap between two bounding boxes, the distance function can output a value of one (e.g. using IoU as distance function). In some examples, when the distance between the two bounding boxes satisfies, e.g., is greater than or equal to or either, a threshold distance, the distance function can output a value of one.

In some implementations, the amount of overlap between the FA_box and gth box is always below a certain threshold otherwise the FA-box is considered as true detection and is getting positive feedback rather than negative.

In some implementations, the distance function can output values that are bounded. For instance, the distance function can output values between one and two, inclusive. Values closer to two can indicate a greater amount of overlap or a closer distance between bounding boxes compared to values closer to one that indicate no overlap or a further distance between bounding boxes.

The model training system 120 can use equation (2) below to determine a penalty p to use during training. The training value tv can be a value the model training system 120 uses to train the object detection model 122 when the model training system 120 is not correcting for co-occurrence bias. The model training system 120 can adjust the training value tv to determine the penalty p to use when updating the object detection model 122 during a training iteration for a training image with co-occurring objects, e.g., with co-occurrence bias. Equation (3) shows an example:

$$p = tv * sf \quad (3)$$

The scale factor, sf, is a value greater than or equal to one. Hence when it is multiplied with the tv, as a lower bound, the normal backpropagation error is generated by the system. Upon determining the penalty p for a training image for which the object detection model 122 had a false alarm, e.g., detected a co-occurring object when it should not have or detected an incorrect co-occurring object, the model training system 120 can update the object detection model 122 using the penalty p instead of the training value tv alone. For instance, the model training system 120 can use the penalty p during backward propagation for the object detection model 122.

The model training system 120 can train the object detection model 122 until one or more training thresholds are satisfied. The training thresholds can include a model accuracy threshold, a quantity of training iterations, or another appropriate training threshold When the one or more training thresholds are satisfied, the model training system 120 can provide the object detection model 122 to a device. For example, the model training system can provide the object detection model 122 to a camera, e.g., the doorbell camera 102, for use analyzing objects depicted in images captured by the camera.

The doorbell camera 102 can then use the trained object detection model 122 to more accurately detect co-occurring objects, such as co-occurrence between a car and a human depicted in an image. For instance, the doorbell camera 102 captures images, e.g., a video sequence, that depict a field of view 110 in front of the property 105. The field of view 110 includes a car 106 and a human 108. The doorbell camera 102 captures the video sequence that includes the image 112. The image 112 depicts the car 106 and the human 108, as well as background content, such as a driveway and multiple plants. The depiction of the car 106 and the human 108 in the image 112 are near each other, e.g., within a threshold distance, in the same image 112. Thus, the car 106 and the human 108 co-occur in the image 112.

The doorbell camera 102 can use the trained object detection model 122 to more accurately detect the depiction of the car 106 and the human 108 in the image 112. For example, the doorbell camera 102 can include an object detector that uses the trained object detection model 122 to identify a first bounding box 116 around the depiction of the car 106, and a second bounding box 118 around the depiction of the human 108. The object detector can provide, to the trained object detection model 122, data for the image 112 to cause the trained object detection model 122 to identify the first bounding box 116 and the second bounding box 118.

The object detector can also receive, from the trained object detection model 122, labels for the bounding boxes for the image 112. For instance, the object detector can receive a first label for the first bounding box 116 as "CAR" and a second label for the second bounding box 118 as "HUMAN." As described in this example, the trained object detection model 122 accurately labels the first bounding box 116 as CAR and the second bounding box 118 as HUMAN.

Although these examples use CAR and HUMAN as labels, the object detection model 122 can use any appropriate labels. For instance, the object detection model 122 can use a label of VEHICLE instead of or in addition to a label of CAR. The object detection model can use a label of PERSON instead of or in addition to a label of HUMAN.

The model training system 120 and the doorbell camera 102 are each examples of a system implemented as computer programs on one or more computers in one or more locations, in which the systems, components, and techniques described in this document are implemented. In some implementations, the model training system 120 and the doorbell camera 102 can be part of the same system. The model training system 120 may use a single server computer or multiple server computers operating in conjunction with one another, including, for example, a set of remote computers deployed as a cloud computing service. The model training system 120, the doorbell camera 102, e.g., the object detector, or both, can include one or more data processing apparatuses. For instance, the model training system 120 and the object detector can include one or more data processors and instructions that cause the one or more data processors to perform the operations discussed herein.

The various functional components of the model training system 120, the doorbell camera 102, or both, may be installed on one or more computers as separate functional components or as different modules of a same functional component. For example, the object detection model 122 and a database for the training images 124 can be implemented as computer programs installed on one or more computers in one or more locations that are coupled to each through a network. In cloud-based systems for example, these components can be implemented by individual computing nodes of a distributed computing system.

The model training system 120 can provide the trained object detection model 122 to a camera using any appropriate method, hardware, or both. For instance, the model training system 120 can provide the trained object detection model 122 to a camera assembly system, e.g., using a network. The camera assembly system can install the trained object detection model 122 on a camera, e.g., as part of an object detector installed or built into the camera. For example, the camera assembly system can install one or more data processing apparatuses into the camera that implement the object detector.

Figure 2A:
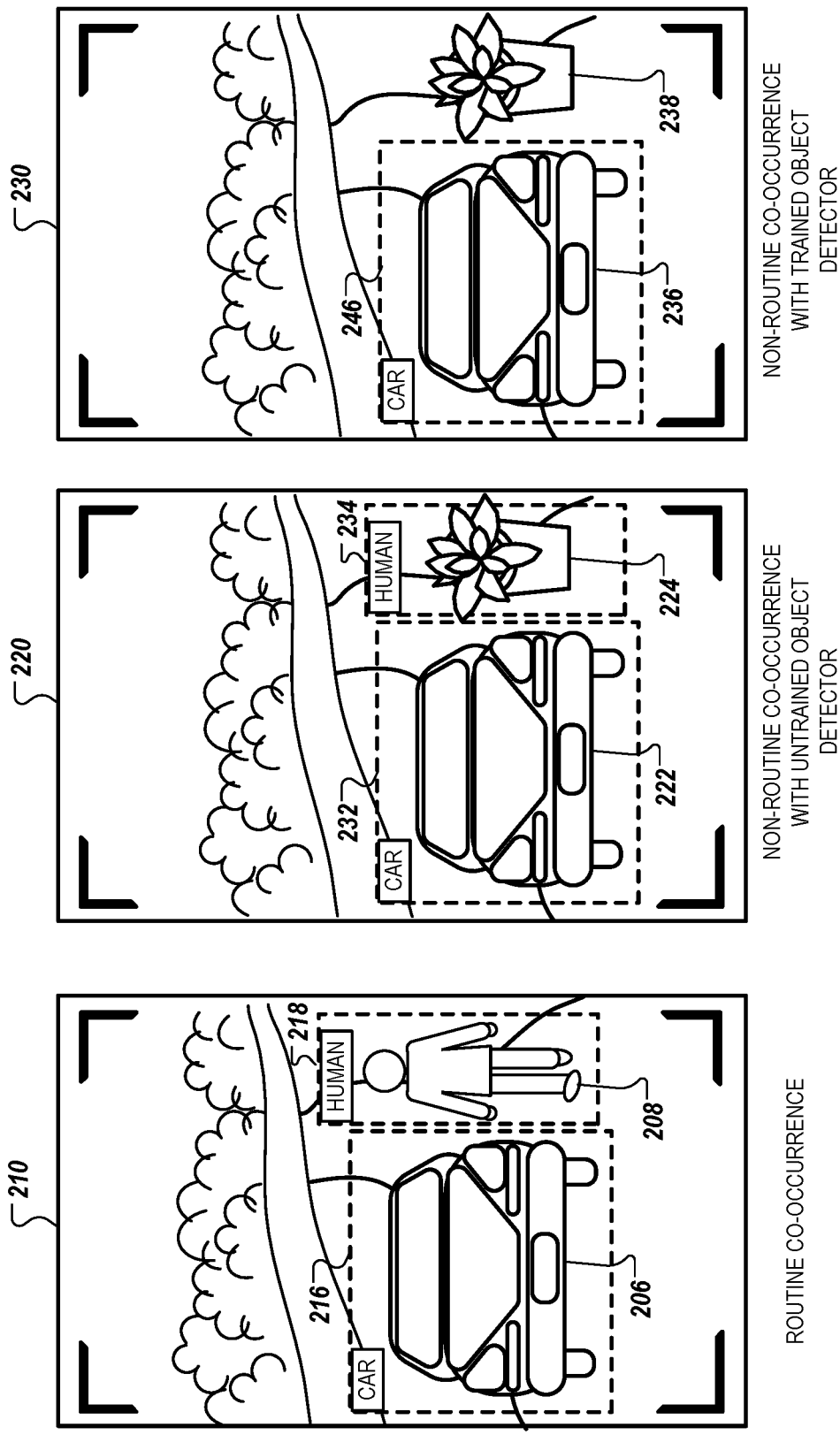

FIGS. 2A and 2B illustrate example images showing video object detection with co-occurrence. FIGS. 2A and 2B each illustrate an example image with accurate object detection of a routine co-occurrence, an example image with inaccurate object detection of a non-routine co-occurrence with an untrained object detection model, and an example image with accurate object detection of a non-routine co-occurrence with a trained object detection model. As described in this document, an untrained object detection model need not be untrained for object detection in general, but instead can be untrained with respect to co-occurrence bias. For instance, an untrained object detection model can be a model that has not been trained, or not been trained sufficiently, to reduce co-occurrence bias. In contrast, as described above, a trained object detection model is a model that has been trained to reduce co-occurrence bias.

With respect to FIG. 2A, the images 210, 220, and 230 can be, for example, images of video captured by the doorbell camera 102. The image 210 shows accurate object detection of a routine-co-occurrence. The image 210 includes images of a car 206 and a human 208. The human 208 and the car 206 co-occur in the image 210. Because humans and cars routinely co-occur in images, co-occurrence bias can improve the object detection model's ability to accurately detect and identify the objects in image 210. Therefore, the object detection model accurately detects the car 206, generates bounding box 216 around the car 206, and labels the bounding box 216 as "CAR." The object detection model also accurately detects the human 208, generates bounding box 218 around the human 208, and labels the bounding box 218 as "HUMAN."

The image 220 shows inaccurate object detection of a non-routine co-occurrence with an untrained object detection model. The image 220 includes depictions of a car 222 and a potted plant 224. The car 222 and the potted plant 224 co-occur in the image 220. Because cars routinely co-occur with humans, and do not routinely co-occur with potted plants, e.g., with potted plants as objects of interest, co-occurrence bias causes a false detection in this example. The object detection model accurately detects the car 222, generates bounding box 232 around the car 222, and labels the bounding box 232 as "CAR." However, the untrained object detection model detects the potted plant 224 and inaccurately identifies the potted plant 224 as a human. The object detection model generates bounding box 234 around the potted plant 224, and incorrectly labels the bounding box 234 as "HUMAN."

The image 230 shows accurate object detection of a non-routine co-occurrence with a trained object detection model. The image 230 includes images of a car 236 and a potted plant 238. The car 236 and the potted plant 238 co-occur in the image 230. Because cars routinely co-occur with humans, and do not routinely co-occur with potted plants, e.g., with potted plants as objects of interest, co-occurrence bias could cause a false detection for an untrained object detection model. However, the object detection model is trained to reduce co-occurrence bias. The object detection model accurately detects the car 236, generates bounding box 246 around the car 236, and labels the bounding box 246 as "CAR." The object detection model recognizes that the potted plant 238 is not a human or another object of interest. The object detection model does not generate a bounding box around the potted plant 238. Thus, the trained object detection model is less likely to generate co-occurrence related false alarms than the untrained object detection model.

With respect to FIG. 2B, the images 250, 260, and 270 can be, for example, images of video captured by the doorbell camera 102. The image 250 shows accurate object detection of a routine-co-occurrence. The image 250 includes images of a human 256 and an animal 258. The animal 258 and the human 256 co-occur in the image 250. Because humans and animals often co-occur in images, co-occurrence bias can improve the object detection model's ability to accurately detect and identify the objects in image 250. Therefore, the object detection model accurately detects the human 256, generates bounding box 266 around the human 256, and labels the bounding box 266 as "HUMAN." The object detection model also accurately detects the animal 258, generates bounding box 268 around the animal 258, and labels the bounding box 268 as "ANIMAL."

The image 260 shows inaccurate object detection of a non-routine co-occurrence with an untrained object detection model. The image 260 includes images of a human 272 and a potted plant 274. The human 272 and the potted plant 274 co-occur in the image 260. Because humans routinely co-occur with animals, and do not routinely co-occur with potted plants, e.g., with potted plants as objects of interest, co-occurrence bias causes a false detection. The object detection model accurately detects the human 272, generates bounding box 282 around the human 272, and labels the bounding box 282 as "HUMAN." However, the untrained object detection model detects the potted plant 274 and inaccurately identifies the potted plant 224 as an animal. The object detection model generates bounding box 284 around the potted plant 274, and incorrectly labels the bounding box 284 as "ANIMAL."

The image 270 shows accurate object detection of a non-routine co-occurrence with a trained object detection model. The image 270 includes images of a human 286 and a potted plant 288. The human 286 and the potted plant 288 co-occur in the image 270. Because humans routinely co-occur with animals, and do not routinely co-occur with potted plants, e.g., with potted plants as objects of interest, co-occurrence bias could cause a false detection for an untrained object detection model. However, the object detection model is trained to reduce co-occurrence bias. The object detection model accurately detects the human 286, generates bounding box 296 around the human 286, and labels the bounding box 296 as "HUMAN." The object detection model recognizes that the potted plant 288 is not an animal or another object of interest. The object detection model does not generate a bounding box around the potted plant 288. Thus, the trained object detection model is less likely to generate co-occurrence related false alarms than the untrained object detection model.

Figure 3:
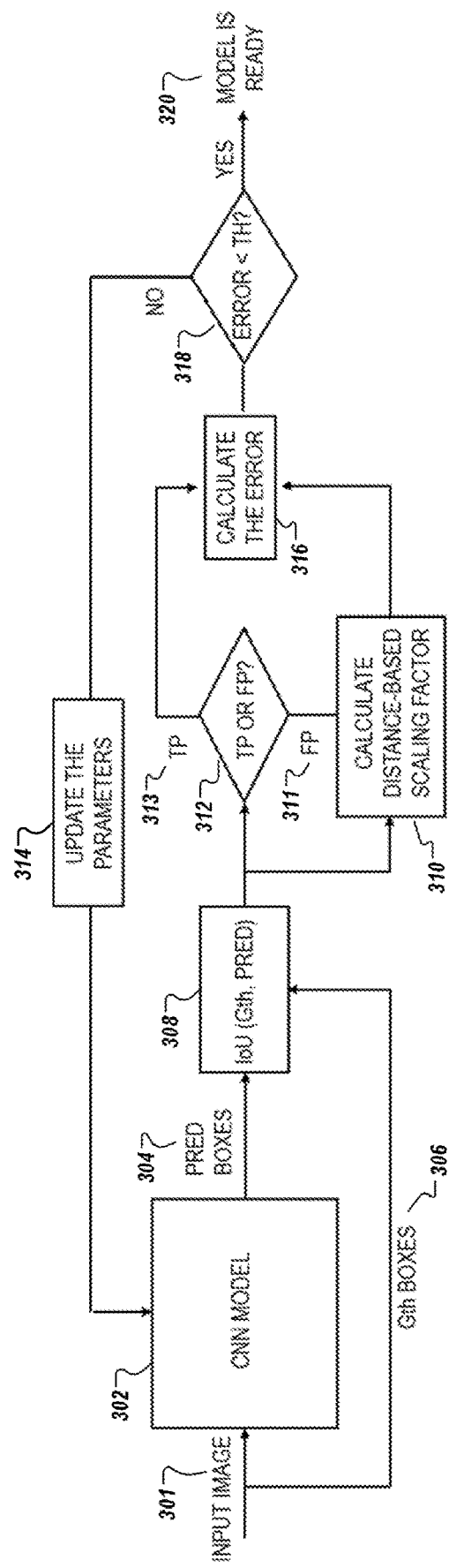
FIG. 3 is a flow chart illustrating an example of a training process for video object detection with co-occurrence.

FIG. 3 is a flow chart illustrating an example of a training process 300 for video object detection with co-occurrence.

A model training system can train any appropriate type of model using the training process 300. For instance, the model training system can train a deep learning model, e.g., a convolutional neural network ("CNN"), or another type of neural network. In some examples, the model training system can train a model other than a neural network.

Deep learning models for object detection are trained using data that are provided to them. An object detection model can be trained on a large dataset of images. In a "CNN" 302 model, each convolutional filter extracts the information from a local region of an image or from the feature map that is the input to that filter. The local region is referred to as a receptive field of a filter. Filters with larger receptive fields can encode more contextual information in their outputs. In a deep CNN model 302, filters in the deeper layers have larger receptive fields with respect to the original image compared to other layers in a deep CNN, layers in other types of neural networks, or both. Therefore, as the image goes through the deeper layers of the CNN model 302, context information in each pixel of the generated feature map becomes richer. Thus, a local region of a feature map that is the output of a deep layer is mapped to a larger region of the original image. As a result, deep features not only encode information about an object of interest, e.g., a human, vehicle, or animal, but the deep features encode context information regarding surroundings of the object as well. While such context information can be useful for generating robust and generalizable models, context information can also introduce unwanted bias in the model.

Co-occurrence biases can be incorporated into the training process 300 for an object detection model in order to reduce false alarms generated by the trained model. To this end, an adaptive penalty scheme can be added to the training process. To train an object detection model, e.g., a CNN model 302, a series of forward pass and backward backpropagation is performed on training data.

The training process 300 includes comparing predicted (PRED) bounding boxes 304 output by the CNN model 302 to ground-truth (Gth) bounding boxes 306 of an input image 301. An IoU 308 or generalized intersection over union GIoU is determined to evaluate accuracy of the predicted boxes 304. True positive ("TP") 313 detections and false positive ("FP") 311 detections are identified 312.

In an adaptive false alarm penalty scheme, when the model generates a false positive 311 detection box in a forward pass, the distance between the false positive 311 detection bounding box and one or more of the ground-truth bounding boxes 306 presented in the input image 301 can be calculated. In some examples, the distance between the false positive 311 detection bounding box and all of the ground-truth bounding boxes 306 presented in the input image 301 can be calculated. The distance can be, for example, an GIoU between the false positive 311 detection box and the closest ground-truth box 306, or any other metric that shows the closeness of the two boxes to each other.

If the false positive 311 detection bounding box occurs in the vicinity of a ground-truth bounding box 306, it is likely that co-occurrence bias contributed to generating the false positive 311 alarm. The model can be penalized more for the false positive 311 alarm that shows evidence of co-occurrence bias, than for a false positive 311 alarm that does not show evidence of co-occurrence bias. To determine the penalty, a degree of the penalty, or both, a distance-based scaling factor can be calculated 310. The scaling factor can be inversely proportional to the distance between the false positive 311 detection bounding box and the closest ground-truth bounding box 306. In some examples, the scaling factor is inversely proportional to the distance between the false positive 311 detection bounding box and the closest ground-truth bounding box 306 and can be bounded, e.g., such that the highest scaling factor is two and the lowest scaling factor is one.

The distance-based scaling factor can be multiplied with the backpropagation training value that is calculated 316 for the false positive 311 detection. Thus, based on detections that the model generates in a forward pass, positive and negative training values can be calculated 316 to penalize the model for false positive 311 detections and boost true positive 313 detections. A positive training value can be a training value determined with a scaling factor of one, e.g., when the object detection model accurately predicted a label for a bounding box, e.g., a true positive. A negative training value can be a training value determined with a scaling factor other than one, e.g., when the object detection model inaccurately predicted a label for a bounding box, e.g., a false positive.

In some examples, an error for the object detection model can be compared 318 to a threshold (TH) to determine if parameters for the object detection model are to be updated 314. This approach can reduce the number of false positive 311 alarms generated by the object detection model due to co-occurrence bias. For instance, if an accuracy for the object detection model does not satisfy a threshold accuracy, the object training system can update 314 one or more parameters for the object detection model, e.g., can update one or more weights in a CNN using a penalty that is a combination of the scaling factor and the training value. If the accuracy for the object detection model satisfies the threshold accuracy, the object training system can determine to skip further training for the object detection model. The training process 300 results in a trained object detection model 320 for which the calculated errors, including the distance-based scaling factors, can be reduced below the threshold.

Figure 4:
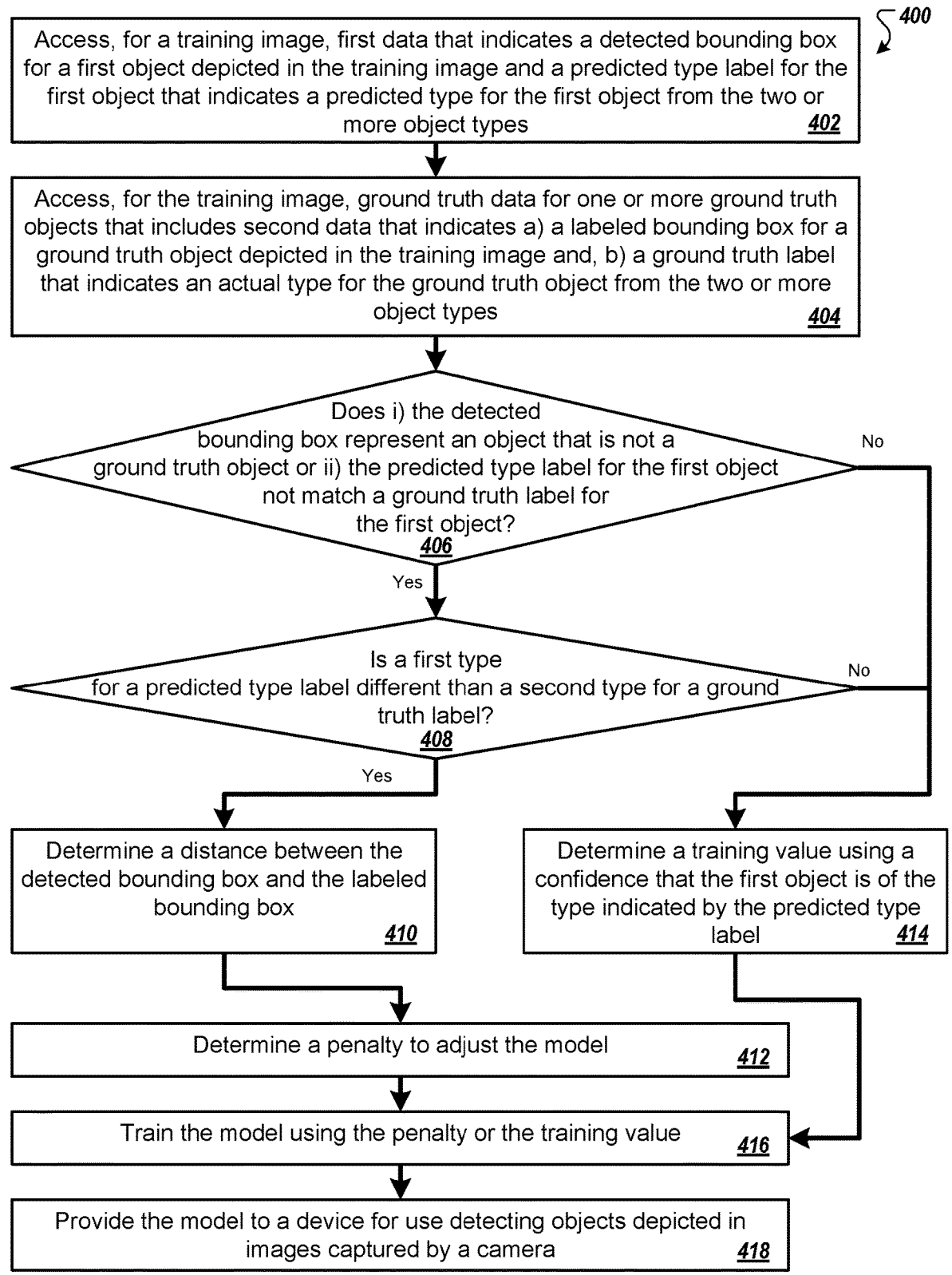
FIG. 4 is a flow diagram of a process for training an object detection model.

FIG. 4 is a flow diagram of a process 400 for training an object detection model. For example, the process 400 can be used by the model training system 120 from the environment 100.

A model training system accesses, for a training image, first data that indicates a detected bounding box for a first object depicted in the training image and a predicted type label for the first object that indicates a predicted type for the first object from the two or more object types (402). For instance, the model training system can access a database of training images. The database can include, in memory and for the training image, the first data. The first data can be in any appropriate format.

The first object can be any appropriate type of object. The first object need not be an object of interest for which the model training system is training a model. For instance, objects of interest can include human, animals, and vehicles. The first object can be a human, a plant, a vehicle door, or a building.

The model training system accesses, for the training image, ground truth data for one or more ground truth objects that includes second data that indicates a) a labeled bounding box for a ground truth object depicted in the training image and, b) a ground truth label that indicates an actual type for the ground truth object from the two or more object types (404). For example, the model training system can access the database of training images that includes the ground truth data. For an image that depicts multiple objects of interest, the database can include second data for each of the multiple objects of interest. For an image that depicts a single object of interest, the database can include second data for only that single object of interest. In some examples, some of the training images might not include any objects of interest and would not have corresponding second data.

The model training system determines whether i) the detected bounding box represent an object that is not a ground truth object or ii) the predicted type label for the first object does not match a ground truth label for the first object (406). The model training system can use the first data and the ground truth data to make the determination.

For instance, the ground truth data can indicate that there is only one ground truth object depicted in the training image. When this occurs, the model training system can determine, using the ground truth data, that the detected bounding box represents an object that is not a ground truth object when the first object and the single ground truth objects are different objects. The model training system can make this determination using locations for the detected bounding box and the labeled bounding box, data for the first object and the ground truth object, e.g., data that indicates the depicted objects such as pixel data, or other appropriate data. This can occur when the model, e.g., the object detection model, detects a car door or a plant as an object when neither a car door nor a plant are an object of interest.

In some examples, the ground truth data can include data for a second labeled bounding box for a second ground truth object. In these examples, the model training system can determine that the first object and the second ground truth object are likely the same object. This can occur when the model training system determines that the detected bounding box and the second labeled bounding box have approximately the same location in the training image. In some instances, the model training system can use other data for the first object and the second ground truth object to determine that they are likely the same object, e.g., other data that represents the depicted objects.

The model training system can then determine whether the predicted type label for the first object matches, e.g., is the same as, a second ground truth label that indicates an actual type for the second ground truth object from the two or more object types. When the model training system determines that the detected bounding box represents an object that is a ground truth object, e.g., the second ground truth object, and the predicted type label matches the second ground truth label, the model training system can proceed to step 414, described in more detail below. When the model training system determines that the detected bounding box represents an object that is not a ground truth object, or that the predicted label for the first object does not match a ground truth label for the first object, e.g., the second ground truth object, the model training system can proceed to step 408.

The model training system determines whether a first type for a predicted type label is different than a second type for a ground truth label (408). The model training system can use any appropriate process to determine whether the first type for the predicted type label is different than the second type for the ground truth label, e.g., the second ground truth label. For instance, the model training system can use a string comparison process to determine whether the two labels are different.

In some implementations, when the closest labeled bounding box has the same object type as the detected bounding box, the model training system can determine another labeled bounding box that is closest to the detected bounding box that has a different type. For instance, the model training system can analyze a first labeled bounding box that is closest to the detected bounding box. If the first labeled bounding box has the same object type as the detected bounding boxes, e.g., based on the corresponding labels, the model training system can determine a second labeled bounding box that is second closest to the detected bounding box and repeat the process. If all bounding boxes have the same object type as the detected bounding box, the model training system can proceed to step 414. If at least one of the labeled bounding boxes does not have the same object type as the detected bounding box, based on the corresponding labels, the model training system can proceed to step 410, or 412, based on the at least one of the labeled bounding boxes and the detected bounding box. In these implementations, step 410 and step 408 are combined, so the model training system need not perform step 410 after determining the labeled bounding box that has a different object type from the detected bounding box.

In response to determining that the first type is different than the second type, the model training system determines a distance between the detected bounding box and the labeled bounding box (410). For example, the model training system uses an intersection over union process to determine the distance between the two bounding boxes.

The model training system determines a penalty to adjust the model (412). As described in more detail above, the model training system can determine the penalty using the distance between the detected bounding box and the labeled bounding box. The penalty can be a combination of a training value, that would be used to update the model if a co-occurrence error had not occurred, and a scaling factor.

In some implementations, the model training system can determine the penalty based on the object types for the bounding boxes. For example, when the detected bounding box and the labeled bounding box have the same object type, and the same labels, the model training system can determine a first penalty. When the detected bounding box and the labeled bounding box have different object types, and different labels, the model training system can determine a second penalty. The second penalty can be different than the first penalty.

When the model training system determines that a) the detected bounding box represents a ground truth object for which the predicted type label matches the ground truth label, or b) that the first type for the predicted type label is not different than the second type for the ground truth label, the model training system can determine a training value using a confidence that the first object is of the type indicated by the predicted type label (414). For instance, under certain conditions the model training system can determine that the model need not be trained to correct for co-occurrence bias. Under these certain conditions, the model training system can train the model using a normal training process, e.g., using the training value.

The model training system trains the model using the penalty or the training value (416). For example, after determining the penalty or the training value, the model training system trains the model using the corresponding value.

The model training system provides the model to a device for use detecting objects depicted in images captured by a camera (418). For instance, the model training system can provide the model to a camera or a camera assembly system that installs the model on a camera. The camera can be any appropriate type of camera, such as a doorbell camera. The camera can then use the model to detect objects of interest and label those objects. In some examples, depending on the detected objects, the camera or another system, e.g., a security system, can perform an automated action in response to detection of an object of interest by the camera.

The order of steps in the process 400 described above is illustrative only, and training the object detection model can be performed in different orders. For example, the model training system can access the ground truth data and then access the first data.

In some implementations, the process 400 can include additional steps, fewer steps, or some of the steps can be divided into multiple steps. For example, the model training system can perform multiple iterations of one or more steps in the process 400. For example, after training the model using the penalty in step 412, the model training system can access data for a second training image and repeat one or more steps in the process 400. In some examples, the model training system can perform steps 402, 404, 406, 410, and 412. For instance, the model training system can perform one or more steps in the process 400 without performing step 408.

Figure 5:
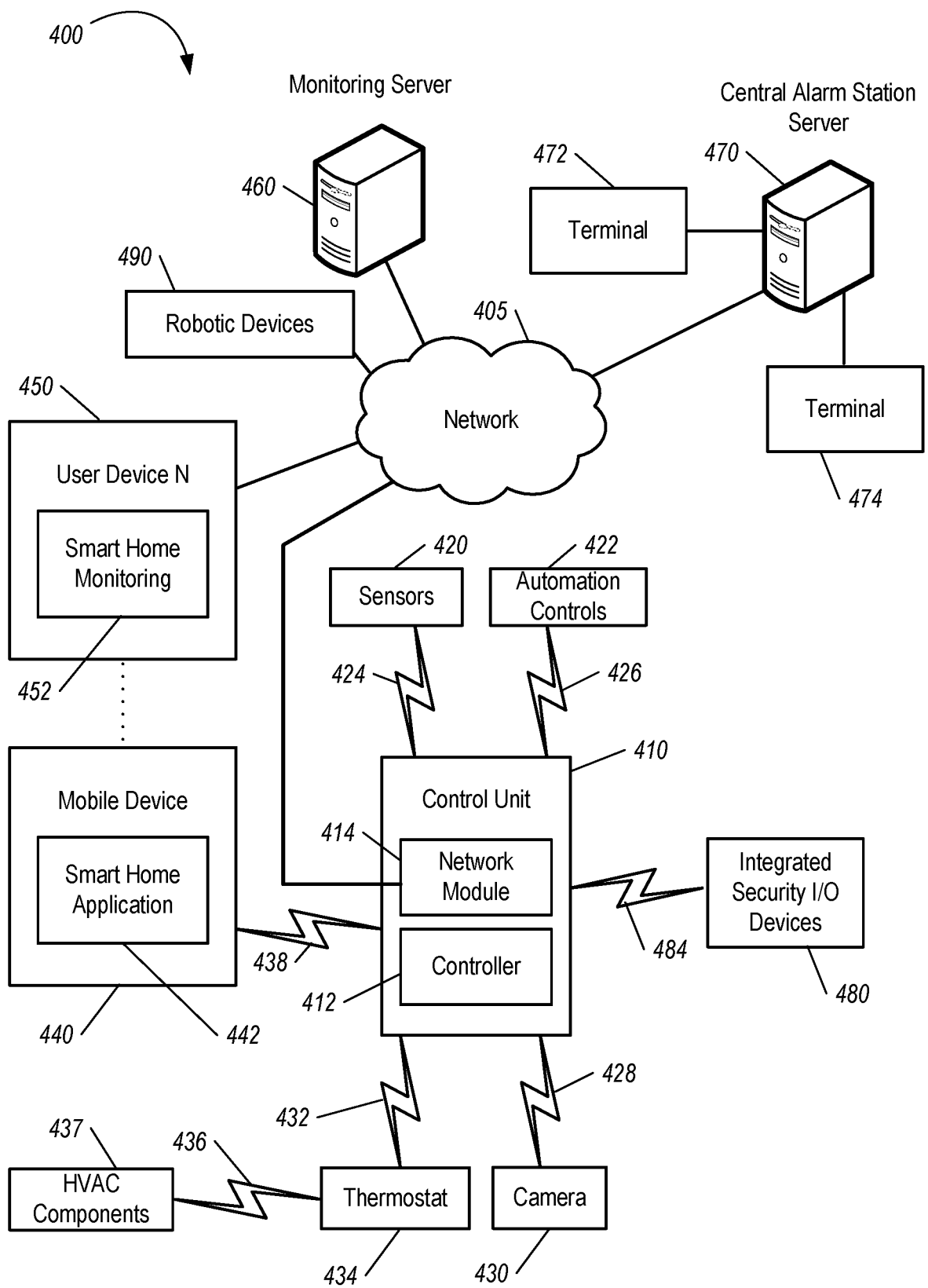
FIG. 5 is a diagram illustrating an example of a home monitoring system.

FIG. 5 is a diagram illustrating an example of a home monitoring system 500. The monitoring system 500 includes a network 505, a control unit 510, one or more user devices 540 and 550, a monitoring server 560, and a central alarm station server 570. In some examples, the network 505 facilitates communications between the control unit 510, the one or more user devices 540 and 550, the monitoring server 560, and the central alarm station server 570.

The network 505 is configured to enable exchange of electronic communications between devices connected to the network 505. For example, the network 505 may be configured to enable exchange of electronic communications between the control unit 510, the one or more user devices 540 and 550, the monitoring server 560, and the central alarm station server 570. The network 505 may include, for example, one or more of the Internet, Wide Area Networks (WANs), Local Area Networks (LANs), analog or digital wired and wireless telephone networks (e.g., a public switched telephone network (PSTN), Integrated Services Digital Network (ISDN), a cellular network, and Digital Subscriber Line (DSL)), radio, television, cable, satellite, or any other delivery or tunneling mechanism for carrying data. Network 505 may include multiple networks or subnetworks, each of which may include, for example, a wired or wireless data pathway. The network 505 may include a circuit-switched network, a packet-switched data network, or any other network able to carry electronic communications (e.g., data or voice communications). For example, the network 505 may include networks based on the Internet protocol (IP), asynchronous transfer mode (ATM), the PSTN, packet-switched networks based on IP, X.25, or Frame Relay, or other comparable technologies and may support voice using, for example, VoIP, or other comparable protocols used for voice communications. The network 505 may include one or more networks that include wireless data channels and wireless voice channels. The network 505 may be a wireless network, a broadband network, or a combination of networks including a wireless network and a broadband network.

The control unit 510 includes a controller 512 and a network module 514. The controller 512 is configured to control a control unit monitoring system (e.g., a control unit system) that includes the control unit 510. In some examples, the controller 512 may include a processor or other control circuitry configured to execute instructions of a program that controls operation of a control unit system. In these examples, the controller 512 may be configured to receive input from sensors, flow meters, or other devices included in the control unit system and control operations of devices included in the household (e.g., speakers, lights, doors, etc.). For example, the controller 512 may be configured to control operation of the network module 514 included in the control unit 510.

The network module 514 is a communication device configured to exchange communications over the network 505. The network module 514 may be a wireless communication module configured to exchange wireless communications over the network 505. For example, the network module 514 may be a wireless communication device configured to exchange communications over a wireless data channel and a wireless voice channel. In this example, the network module 514 may transmit alarm data over a wireless data channel and establish a two-way voice communication session over a wireless voice channel. The wireless communication device may include one or more of a LTE module, a GSM module, a radio modem, cellular transmission module, or any type of module configured to exchange communications in one of the following formats: LTE, GSM or GPRS, CDMA, EDGE or EGPRS, EV-DO or EVDO, UMTS, or IP.

The network module 514 also may be a wired communication module configured to exchange communications over the network 505 using a wired connection. For instance, the network module 514 may be a modem, a network interface card, or another type of network interface device. The network module 514 may be an Ethernet network card configured to enable the control unit 510 to communicate over a local area network and/or the Internet. The network module 514 also may be a voice band modem configured to enable the alarm panel to communicate over the telephone lines of Plain Old Telephone Systems (POTS).

The control unit system that includes the control unit 510 includes one or more sensors. For example, the monitoring system may include multiple sensors 520. The sensors 520 may include a doorbell camera, lock sensor, a contact sensor, a motion sensor, or any other type of sensor included in a control unit system. The sensors 520 also may include an environmental sensor, such as a temperature sensor, a water sensor, a rain sensor, a wind sensor, a light sensor, a smoke detector, a carbon monoxide detector, an air quality sensor, etc. The sensors 520 further may include a health monitoring sensor, such as a prescription bottle sensor that monitors taking of prescriptions, a blood pressure sensor, a blood sugar sensor, a bed mat configured to sense presence of liquid (e.g., bodily fluids) on the bed mat, etc. In some examples, the health-monitoring sensor can be a wearable sensor that attaches to a user in the home. The health-monitoring sensor can collect various health data, including pulse, heart rate, respiration rate, sugar or glucose level, bodily temperature, or motion data.

The sensors 520 can also include a radio-frequency identification (RFID) sensor that identifies a particular article that includes a pre-assigned RFID tag.

The control unit 510 communicates with the home automation controls 522 and a camera 530 to perform monitoring. The home automation controls 522 are connected to one or more devices that enable automation of actions in the home. For instance, the home automation controls 522 may be connected to one or more lighting systems and may be configured to control operation of the one or more lighting systems. In addition, the home automation controls 522 may be connected to one or more electronic locks at the home and may be configured to control operation of the one or more electronic locks (e.g., control Z-Wave locks using wireless communications in the Z-Wave protocol). Further, the home automation controls 522 may be connected to one or more appliances at the home and may be configured to control operation of the one or more appliances. The home automation controls 522 may include multiple modules that are each specific to the type of device being controlled in an automated manner. The home automation controls 522 may control the one or more devices based on commands received from the control unit 510. For instance, the home automation controls 522 may cause a lighting system to illuminate an area to provide a better image of the area when captured by a camera 530.

The camera 530 may be a video/photographic camera or other type of optical sensing device configured to capture images. For instance, the camera 530 may be configured to capture images of an area within a building or home monitored by the control unit 510. The camera 530 may be configured to capture single, static images of the area and also video images of the area in which multiple images of the area are captured at a relatively high frequency (e.g., thirty images per second). The camera 530 may be controlled based on commands received from the control unit 510.

The camera 530 may be triggered by several different types of techniques. For instance, a Passive Infra-Red (PIR) motion sensor may be built into the camera 530 and used to trigger the camera 530 to capture one or more images when motion is detected. The camera 530 also may include a microwave motion sensor built into the camera and used to trigger the camera 530 to capture one or more images when motion is detected. The camera 530 may have a "normally open" or "normally closed" digital input that can trigger capture of one or more images when external sensors (e.g., the sensors 520, PIR, door/window, etc.) detect motion or other events. In some implementations, the camera 530 receives a command to capture an image when external devices detect motion or another potential alarm event. The camera 530 may receive the command from the controller 512 or directly from one of the sensors 520.

In some examples, the camera 530 triggers integrated or external illuminators (e.g., Infra-Red, Z-wave controlled "white" lights, lights controlled by the home automation controls 522, etc.) to improve image quality when the scene is dark. An integrated or separate light sensor may be used to determine if illumination is desired and may result in increased image quality.

The camera 530 may be programmed with any combination of time/day schedules, system "arming state", or other variables to determine whether images should be captured or not when triggers occur. The camera 530 may enter a low-power mode when not capturing images. In this case, the camera 530 may wake periodically to check for inbound messages from the controller 512. The camera 530 may be powered by internal, replaceable batteries if located remotely from the control unit 510. The camera 530 may employ a small solar cell to recharge the battery when light is available. Alternatively, the camera 530 may be powered by the controller's 512 power supply if the camera 530 is co-located with the controller 512.

In some implementations, the camera 530 communicates directly with the monitoring server 560 over the Internet. In these implementations, image data captured by the camera 530 does not pass through the control unit 510 and the camera 530 receives commands related to operation from the monitoring server 560.

The system 500 also includes thermostat 534 to perform dynamic environmental control at the home. The thermostat 534 is configured to monitor temperature and/or energy consumption of an HVAC system associated with the thermostat 534, and is further configured to provide control of environmental (e.g., temperature) settings. In some implementations, the thermostat 534 can additionally or alternatively receive data relating to activity at a home and/or environmental data at a home, e.g., at various locations indoors and outdoors at the home. The thermostat 534 can directly measure energy consumption of the HVAC system associated with the thermostat, or can estimate energy consumption of the HVAC system associated with the thermostat 534, for example, based on detected usage of one or more components of the HVAC system associated with the thermostat 534. The thermostat 534 can communicate temperature and/or energy monitoring information to or from the control unit 510 and can control the environmental (e.g., temperature) settings based on commands received from the control unit 510.

In some implementations, the thermostat 534 is a dynamically programmable thermostat and can be integrated with the control unit 510. For example, the dynamically programmable thermostat 534 can include the control unit 510, e.g., as an internal component to the dynamically programmable thermostat 534. In addition, the control unit 510 can be a gateway device that communicates with the dynamically programmable thermostat 534. In some implementations, the thermostat 534 is controlled via one or more home automation controls 522.

A module 537 is connected to one or more components of an HVAC system associated with a home, and is configured to control operation of the one or more components of the HVAC system. In some implementations, the module 537 is also configured to monitor energy consumption of the HVAC system components, for example, by directly measuring the energy consumption of the HVAC system components or by estimating the energy usage of the one or more HVAC system components based on detecting usage of components of the HVAC system. The module 537 can communicate energy monitoring information and the state of the HVAC system components to the thermostat 534 and can control the one or more components of the HVAC system based on commands received from the thermostat 534.

The system 500 further includes one or more integrated security devices 580. The one or more integrated security devices may include any type of device used to provide alerts based on received sensor data. For instance, the one or more control units 510 may provide one or more alerts to the one or more integrated security input/output devices 580. Additionally, the one or more control units 510 may receive one or more sensor data from the sensors 520 and determine whether to provide an alert to the one or more integrated security input/output devices 580.

The sensors 520, the home automation controls 522, the camera 530, the thermostat 534, and the integrated security devices 580 may communicate with the controller 512 over communication links 524, 526, 528, 532, 538, and 584. The communication links 524, 526, 528, 532, 538, and 584 may be a wired or wireless data pathway configured to transmit signals from the sensors 520, the home automation controls 522, the camera 530, the thermostat 534, and the integrated security devices 580 to the controller 512. The sensors 520, the home automation controls 522, the camera 530, the thermostat 534, and the integrated security devices 580 may continuously transmit sensed values to the controller 512, periodically transmit sensed values to the controller 512, or transmit sensed values to the controller 512 in response to a change in a sensed value.

The communication links 524, 526, 528, 532, 538, and 584 may include a local network. The sensors 520, the home automation controls 522, the camera 530, the thermostat 534, and the integrated security devices 580, and the controller 512 may exchange data and commands over the local network. The local network may include 802.11 "Wi-Fi" wireless Ethernet (e.g., using low-power Wi-Fi chipsets), Z-Wave, ZigBee, Bluetooth, "Homeplug" or other "Powerline" networks that operate over AC wiring, and a Category 5 (CAT5) or Category 6 (CAT6) wired Ethernet network. The local network may be a mesh network constructed based on the devices connected to the mesh network.

The monitoring server 560 is an electronic device configured to provide monitoring services by exchanging electronic communications with the control unit 510, the one or more user devices 540 and 550, and the central alarm station server 570 over the network 505. For example, the monitoring server 560 may be configured to monitor events generated by the control unit 510. In this example, the monitoring server 560 may exchange electronic communications with the network module 514 included in the control unit 510 to receive information regarding events detected by the control unit 510. The monitoring server 560 also may receive information regarding events from the one or more user devices 540 and 550.

In some examples, the monitoring server 560 may route alert data received from the network module 514 or the one or more user devices 540 and 550 to the central alarm station server 570. For example, the monitoring server 560 may transmit the alert data to the central alarm station server 570 over the network 505.

The monitoring server 560 may store sensor and image data received from the monitoring system and perform analysis of sensor and image data received from the monitoring system. Based on the analysis, the monitoring server 560 may communicate with and control aspects of the control unit 510 or the one or more user devices 540 and 550.

The monitoring server 560 may provide various monitoring services to the system 500. For example, the monitoring server 560 may analyze the sensor, image, and other data to determine an activity pattern of a resident of the home monitored by the system 500. In some implementations, the monitoring server 560 may analyze the data for alarm conditions or may determine and perform actions at the home by issuing commands to one or more of the controls 522, possibly through the control unit 510.

The monitoring server 560 can be configured to provide information (e.g., activity patterns) related to one or more residents of the home monitored by the system 500 (e.g., user 108). For example, one or more of the sensors 520, the home automation controls 522, the camera 530, the thermostat 534, and the integrated security devices 580 can collect data related to a resident including location information (e.g., if the resident is home or is not home) and provide location information to the thermostat 534.

The central alarm station server 570 is an electronic device configured to provide alarm monitoring service by exchanging communications with the control unit 510, the one or more user devices 540 and 550, and the monitoring server 560 over the network 505. For example, the central alarm station server 570 may be configured to monitor alerting events generated by the control unit 510. In this example, the central alarm station server 570 may exchange communications with the network module 514 included in the control unit 510 to receive information regarding alerting events detected by the control unit 510. The central alarm station server 570 also may receive information regarding alerting events from the one or more user devices 540 and 550 and/or the monitoring server 560.

The central alarm station server 570 is connected to multiple terminals 572 and 574. The terminals 572 and 574 may be used by operators to process alerting events. For example, the central alarm station server 570 may route alerting data to the terminals 572 and 574 to enable an operator to process the alerting data. The terminals 572 and 574 may include general-purpose computers (e.g., desktop personal computers, workstations, or laptop computers) that are configured to receive alerting data from a server in the central alarm station server 570 and render a display of information based on the alerting data. For instance, the controller 512 may control the network module 514 to transmit, to the central alarm station server 570, alerting data indicating that a sensor 520 detected motion from a motion sensor via the sensors 520. The central alarm station server 570 may receive the alerting data and route the alerting data to the terminal 572 for processing by an operator associated with the terminal 572. The terminal 572 may render a display to the operator that includes information associated with the alerting event (e.g., the lock sensor data, the motion sensor data, the contact sensor data, etc.) and the operator may handle the alerting event based on the displayed information.

In some implementations, the terminals 572 and 574 may be mobile devices or devices designed for a specific function. Although FIG. 5 illustrates two terminals for brevity, actual implementations may include more (and, perhaps, many more) terminals.

The one or more authorized user devices 540 and 550 are devices that host and display user interfaces. For instance, the user device 540 is a mobile device that hosts or runs one or more native applications (e.g., the home monitoring application 542). The user device 540 may be a cellular phone or a non-cellular locally networked device with a display. The user device 540 may include a cell phone, a smart phone, a tablet PC, a personal digital assistant ("PDA"), or any other portable device configured to communicate over a network and display information. For example, implementations may also include Blackberry-type devices (e.g., as provided by Research in Motion), electronic organizers, iPhone-type devices (e.g., as provided by Apple), iPod devices (e.g., as provided by Apple) or other portable music players, other communication devices, and handheld or portable electronic devices for gaming, communications, and/or data organization. The user device 540 may perform functions unrelated to the monitoring system, such as placing personal telephone calls, playing music, playing video, displaying pictures, browsing the Internet, maintaining an electronic calendar, etc.

The user device 540 includes a home monitoring application 552. The home monitoring application 542 refers to a software/firmware program running on the corresponding mobile device that enables the user interface and features described throughout. The user device 540 may load or install the home monitoring application 542 based on data received over a network or data received from local media. The home monitoring application 542 runs on mobile devices platforms, such as iPhone, iPod touch, Blackberry, Google Android, Windows Mobile, etc. The home monitoring application 542 enables the user device 540 to receive and process image and sensor data from the monitoring system.

The user device 540 may be a general-purpose computer (e.g., a desktop personal computer, a workstation, or a laptop computer) that is configured to communicate with the monitoring server 560 and/or the control unit 510 over the network 505. The user device 540 may be configured to display a smart home user interface 552 that is generated by the user device 540 or generated by the monitoring server 560. For example, the user device 540 may be configured to display a user interface (e.g., a web page) provided by the monitoring server 560 that enables a user to perceive images captured by the camera 530 and/or reports related to the monitoring system. Although FIG. 5 illustrates two user devices for brevity, actual implementations may include more (and, perhaps, many more) or fewer user devices.

In some implementations, the one or more user devices 540 and 550 communicate with and receive monitoring system data from the control unit 510 using the communication link 538. For instance, the one or more user devices 540 and 550 may communicate with the control unit 510 using various local wireless protocols such as Wi-Fi, Bluetooth, Z-wave, ZigBee, HomePlug (Ethernet over power line), or wired protocols such as Ethernet and USB, to connect the one or more user devices 540 and 550 to local security and automation equipment. The one or more user devices 540 and 550 may connect locally to the monitoring system and its sensors and other devices. The local connection may improve the speed of status and control communications because communicating through the network 505 with a remote server (e.g., the monitoring server 560) may be significantly slower.

Although the one or more user devices 540 and 550 are shown as communicating with the control unit 510, the one or more user devices 540 and 550 may communicate directly with the sensors and other devices controlled by the control unit 510. In some implementations, the one or more user devices 540 and 550 replace the control unit 510 and perform the functions of the control unit 510 for local monitoring and long range/offsite communication.

In other implementations, the one or more user devices 540 and 550 receive monitoring system data captured by the control unit 510 through the network 505. The one or more user devices 540, 550 may receive the data from the control unit 510 through the network 505 or the monitoring server 560 may relay data received from the control unit 510 to the one or more user devices 540 and 550 through the network 505. In this regard, the monitoring server 560 may facilitate communication between the one or more user devices 540 and 550 and the monitoring system.

In some implementations, the one or more user devices 540 and 550 may be configured to switch whether the one or more user devices 540 and 550 communicate with the control unit 510 directly (e.g., through link 538) or through the monitoring server 560 (e.g., through network 505) based on a location of the one or more user devices 540 and 550. For instance, when the one or more user devices 540 and 550 are located close to the control unit 510 and in range to communicate directly with the control unit 510, the one or more user devices 540 and 550 use direct communication. When the one or more user devices 540 and 550 are located far from the control unit 510 and not in range to communicate directly with the control unit 510, the one or more user devices 540 and 550 use communication through the monitoring server 560.

Although the one or more user devices 540 and 550 are shown as being connected to the network 505, in some implementations, the one or more user devices 540 and 550 are not connected to the network 505. In these implementations, the one or more user devices 540 and 550 communicate directly with one or more of the monitoring system components and no network (e.g., Internet) connection or reliance on remote servers is needed.

In some implementations, the one or more user devices 540 and 550 are used in conjunction with only local sensors and/or local devices in a house. In these implementations, the system 500 includes the one or more user devices 540 and 550, the sensors 520, the home automation controls 522, the camera 530, and robotic devices 590. The one or more user devices 540 and 550 receive data directly from the sensors 520, the home automation controls 522, the camera 530, and the robotic devices 590, and sends data directly to the sensors 520, the home automation controls 522, the camera 530, and the robotic devices 590. The one or more user devices 540, 550 provide the appropriate interfaces/processing to provide visual surveillance and reporting.

In other implementations, the system 500 further includes network 505 and the sensors 520, the home automation controls 522, the camera 530, the thermostat 534, and the robotic devices 590, and are configured to communicate sensor and image data to the one or more user devices 540 and 550 over network 505 (e.g., the Internet, cellular network, etc.). In yet another implementation, the sensors 520, the home automation controls 522, the camera 530, the thermostat 534, and the robotic devices 590 (or a component, such as a bridge/router) are intelligent enough to change the communication pathway from a direct local pathway when the one or more user devices 540 and 550 are in close physical proximity to the sensors 520, the home automation controls 522, the camera 530, the thermostat 534, and the robotic devices 590 to a pathway over network 505 when the one or more user devices 540 and 550 are farther from the sensors 520, the home automation controls 522, the camera 530, the thermostat 534, and the robotic devices 590.

In some examples, the system leverages GPS information from the one or more user devices 540 and 550 to determine whether the one or more user devices 540 and 550 are close enough to the sensors 520, the home automation controls 522, the camera 530, the thermostat 534, and the robotic devices 590 to use the direct local pathway or whether the one or more user devices 540 and 550 are far enough from the sensors 520, the home automation controls 522, the camera 530, the thermostat 534, and the robotic devices 590 that the pathway over network 505 is required.

In other examples, the system leverages status communications (e.g., pinging) between the one or more user devices 540 and 550 and the sensors 520, the home automation controls 522, the camera 530, the thermostat 534, and the robotic devices 590 to determine whether communication using the direct local pathway is possible. If communication using the direct local pathway is possible, the one or more user devices 540 and 550 communicate with the sensors 520, the home automation controls 522, the camera 530, the thermostat 534, and the robotic devices 590 using the direct local pathway. If communication using the direct local pathway is not possible, the one or more user devices 540 and 550 communicate with the sensors 520, the home automation controls 522, the camera 530, the thermostat 534, and the robotic devices 590 using the pathway over network 505.

In some implementations, the system 500 provides end users with access to images captured by the camera 530 to aid in decision making. The system 500 may transmit the images captured by the camera 530 over a wireless WAN network to the user devices 540 and 550. Because transmission over a wireless WAN network may be relatively expensive, the system 500 can use several techniques to reduce costs while providing access to significant levels of useful visual information (e.g., compressing data, down-sampling data, sending data only over inexpensive LAN connections, or other techniques).

In some implementations, a state of the monitoring system and other events sensed by the monitoring system may be used to enable/disable video/image recording devices (e.g., the camera 530). In these implementations, the camera 530 may be set to capture images on a periodic basis when the alarm system is armed in an "away" state, but set not to capture images when the alarm system is armed in a "home" state or disarmed. In addition, the camera 530 may be triggered to begin capturing images when the alarm system detects an event, such as an alarm event, a door-opening event for a door that leads to an area within a field of view of the camera 530, or motion in the area within the field of view of the camera 530. In other implementations, the camera 530 may capture images continuously, but the captured images may be stored or transmitted over a network when needed.

The described systems, methods, and techniques may be implemented in digital electronic circuitry, computer hardware, firmware, software, or in combinations of these elements. Apparatus implementing these techniques may include appropriate input and output devices, a computer processor, and a computer program product tangibly embodied in a machine-readable storage device for execution by a programmable processor. A process implementing these techniques may be performed by a programmable processor executing a program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device.

Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially designed ASICs (application-specific integrated circuits).

It will be understood that various modifications may be made. For example, other useful implementations could be achieved if steps of the disclosed techniques were performed in a different order and/or if components in the disclosed systems were combined in a different manner and/or replaced or supplemented by other components. Accordingly, other implementations are within the scope of the disclosure.

What is claimed is:

1. A system comprising one or more computers and one or more storage devices on which are stored instructions that are operable, when executed by the one or more computers, to cause the one or more computers to perform operations comprising:
   while training a model to detect objects of any of two or more object types that are depicted in images:
   accessing, for a training image, first data that indicates a detected bounding box for a first object depicted in the training image and a predicted type label for the first object that indicates a predicted type for the first object from the two or more object types;
   accessing, for the training image, ground truth data for one or more ground truth objects that includes second data that indicates a) a labeled bounding box for a ground truth object depicted in the training image and b) a ground truth label that indicates an actual type for the ground truth object from the two or more object types, wherein the ground truth object is a different object than the first object;
   determining, using the first data and the ground truth data, that i) the detected bounding box represents an object that is not a ground truth object represented by the ground truth data or ii) the predicted type label for the first object does not match a ground truth label for the first object identified by the ground truth data;
   in response to determining that i) the detected bounding box represents an object that is not a ground truth object or ii) the predicted type label for the first object does not match a ground truth label for the first object, determining a penalty to adjust the model using a distance between a) a first location of the detected bounding box in the training image and b) a second location of the labeled bounding box in the training image; and
   training the model using the penalty.

2. The system of claim 1, the operations comprising:
   after training the model using the penalty, storing the model in memory.

3. The system of claim 1, the operations comprising:
   after training the model using the penalty, providing the model to a device for use detecting objects depicted in images captured by a camera.

4. The system of claim 3, wherein providing the model comprises providing the model to the camera.

5. The system of claim 1, wherein:
   the model includes one or more convolutional neural network layers; and
   training the model comprises training at least one of the one or more convolutional neural network layers using the penalty.

6. The system of claim 1, the operations comprising:
   while training the model to detect objects of any of the two or more object types that are depicted in images:
   determining that the predicted type label for the first object represents a first type from the two or more object types;
   determining that the ground truth label represents another type from the two or more object types; and
   determining that the first type is a different type than the other type, wherein determining the penalty to adjust the model using the distance between a) the first location of the detected bounding box in the training image and b) the second location of the labeled bounding box in the training image is responsive to determining that the first type is a different type than the other type.

7. The system of claim 6, the operations comprising:
while training the model to detect objects of any of the two or more object types that are depicted in images:
determining, for a second training image, that a second predicted type label for a second object detected in the second training image represents the same type from the two or more object types as all of one or more second ground truth labels for the second training image; and
in response to determining that the second predicted type label for the second object detected in the second training image represents the same type from the two or more object types as all of the one or more second ground truth labels for the second training image, determining to skip a determination of a penalty using a second distance between a) a third location in the second training image of a second detected bounding box for the second predicted type label and b) a fourth location in the second training image of a second labeled bounding box for one of the one or more second ground truth labels.

8. The system of claim 7, wherein:
determining the penalty to adjust the model comprises:
determining a scaling factor using the distance between a) the first location of the detected bounding box in the training image and b) the second location of the labeled bounding box in the training image; and
determining the penalty by combining the scaling factor with a training value that is based on an error that indicates that i) the detected bounding box represents an object that is not a ground truth object or ii) the predicted type label for the first object does not match the ground truth label for the first object; and
determining to skip the determination of the penalty using the second distance between the second detected bounding box for the second predicted type label and the second labeled bounding box for one of the one or more second ground truth labels comprises:
determining a second training value that is based on a second error that indicates that i) the second detected bounding box represents a second object that is not one of one or more second ground truth objects for the one or more second ground truth labels or ii) the second predicted type label for the second object matches a second ground truth label from the one or more second ground truth labels for the second object.

9. The system of claim 8, the operations comprising:
determining the training value using a confidence that the first object is of the type indicated by the predicted type label; or
determining the second training value using a second confidence that the second object is of the type indicated by the second predicted type label.

10. The system of claim 8, wherein determining the scaling factor comprises determining a value between one and two, inclusively.

11. The system of claim 6, wherein determining the penalty comprises determining the penalty to adjust the model using the distance between a) the first location of the detected bounding box in the training image and b) the second location of the labeled bounding box in the training image (a) for the ground truth label (b) that is a closest labeled bounding box to the detected bounding box from a plurality of labeled bounding boxes for the training image and (c) that represents another type from the two or more object types that is a different type than the first type for the predicted type label.

12. The system of claim 11, the operations comprising:
determining, for each of two or more labeled bounding boxes including the labeled bounding box that is the closest labeled bounding box, a distance between a) a location of the respective labeled bounding box in the training image and b) another location of the detected bounding box in the training image.

13. The system of claim 1, wherein determining the penalty comprises determining the penalty to adjust the model using the distance between a) the first location of the detected bounding box in the training image and b) the second location of the labeled bounding box in the training image (a) for the ground truth label (b) that is a closest labeled bounding box to the detected bounding box.

14. The system of claim 1, the operations comprising:
while training the model to detect objects of any of the two or more object types that are depicted in images:
determining, for a second training image, that a second distance between a) a third location of a second detected bounding box for a second predicted type label in the second training image and b) a fourth location of a second labeled bounding box for one of one or more second ground truth labels in the second training image satisfies a threshold distance; and
in response to determining that the second distance between a) the third location of the second detected bounding box for the second predicted type label in the second training image and b) the fourth location of the second labeled bounding box for one of the one or more second ground truth labels in the second training image satisfies the threshold distance, determining to skip a determination of a penalty using the second distance between a) the third location of the second detected bounding box for the second predicted type label in the second training image and b) the fourth location of second labeled bounding box for one of the one or more second ground truth labels in the second training image.

15. The system of claim 1, the operations comprising:
while training the model to detect objects of any of the two or more object types that are depicted in images:
determining, for the training image, that the distance between a) the first location of the detected bounding box in the training image and b) the second location of the labeled bounding box in the training image does not satisfy a threshold distance, wherein determining a penalty to adjust the model is responsive to determining that the distance between a) the first location of the detected bounding box in the training image and b) the second location of the labeled bounding box in the training image does not satisfy the threshold distance.

16. The system of claim 1, the operations comprising determining the distance between a) the first location of the detected bounding box in the training image and jj the second location of one of the one or more labeled bounding boxes in the training image.

17. The system of claim 1, wherein determining the penalty comprises:
determining, from each of two or more distance regions that each have a different scaling factor and define a region that has a different distance range from the labeled bounding box than the other distance regions, a distance region that has a distance range that includes the distance between a) the first location of the detected bounding box in the training image and b) the second location of the labeled bounding box in the training image; and determining the penalty by combining the scaling factor for the distance region with a training value that is calculated using an error that indicates that i) the detected bounding box represents an object that is not a ground truth object or ii) the predicted type label for the first object does not match a ground truth label for the first object.

18. The system of claim 1, wherein determining the penalty comprises determining the penalty to adjust the model using a distance function that measures an amount of intersection between a) the first location of the detected bounding box in the training image and b) the second location of the labeled bounding box in the training image.

19. The system of claim 1, wherein determining the penalty comprises determining the penalty to adjust the model using a generalized intersection over union function that measures an amount of intersection between a) the first location of the detected bounding box in the training image and b) the second location of the labeled bounding box in the training image.

20. A non-transitory computer storage medium encoded with instructions that, when executed by one or more computers, cause the one or more computers to perform operations comprising:

while training a model to detect objects of any of two or more object types that are depicted in images:

accessing, for a training image, first data that indicates a detected bounding box for a first object depicted in the training image and a predicted type label for the first object that indicates a predicted type for the first object from the two or more object types;

accessing, for the training image, ground truth data for one or more ground truth objects that includes second data that indicates a) a labeled bounding box for a ground truth object depicted in the training image and b) a ground truth label that indicates an actual type for the ground truth object from the two or more object types, wherein the ground truth object is a different object than the first object;

determining, using the first data and the ground truth data, that i) the detected bounding box represents an object that is not a ground truth object represented by the ground truth data or ii) the predicted type label for the first object does not match a ground truth label for the first object identified by the ground truth data;

in response to determining that i) the detected bounding box represents an object that is not a ground truth object or ii) the predicted type label for the first object does not match a ground truth label for the first object, determining a penalty to adjust the model using a distance between a) a first location of the detected bounding box in the training image and b) a second location of the labeled bounding box in the training image; and training the model using the penalty.

21. The medium of claim 20, the operations comprising:

after training the model using the penalty, storing the model in memory.

22. A computer-implemented method comprising:

while training a model to detect objects of any of two or more object types that are depicted in images:

accessing, for a training image, first data that indicates a detected bounding box for a first object depicted in the training image and a predicted type label for the first object that indicates a predicted type for the first object from the two or more object types;

accessing, for the training image, ground truth data for one or more ground truth objects that includes second data that indicates a) a labeled bounding box for a ground truth object depicted in the training image and b) a ground truth label that indicates an actual type for the ground truth object from the two or more object types, wherein the ground truth object is a different object than the first object;

determining, using the first data and the ground truth data, that i) the detected bounding box represents an object that is not a ground truth object represented by the ground truth data or ii) the predicted type label for the first object does not match a ground truth label for the first object identified by the ground truth data;

in response to determining that i) the detected bounding box represents an object that is not a ground truth object or ii) the predicted type label for the first object does not match a ground truth label for the first object, determining a penalty to adjust the model using a distance between a) a first location of the detected bounding box in the training image and b) a second location of the labeled bounding box in the training image; and training the model using the penalty.

* * * * *